(12) United States Patent
Ioannides et al.

(10) Patent No.: US 6,488,324 B1
(45) Date of Patent: Dec. 3, 2002

(54) RAILWAY VEHICLE WHEEL WITH IMPROVED DAMPING CHARACTERISTICS

(75) Inventors: Eustathios Ioannides, Zeist (NL); Henning Hans Wittmeyer, Hilversum (NL)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/647,878

(22) PCT Filed: Apr. 22, 1999

(86) PCT No.: PCT/NL99/00231

§ 371 (c)(1),
(2), (4) Date: Oct. 30, 2000

(87) PCT Pub. No.: WO99/54152

PCT Pub. Date: Oct. 28, 1999

(30) Foreign Application Priority Data

Apr. 22, 1998 (NL) .............................. 1008964

(51) Int. Cl.⁷ .......................... B60B 17/00; B60C 7/00
(52) U.S. Cl. ..................... 295/7; 295/11; 295/31.1; 152/251
(58) Field of Search .................. 295/1, 7, 11, 31.1; 152/47, 251

(56) References Cited

U.S. PATENT DOCUMENTS

| | | | | | |
|---|---|---|---|---|---|
| 1,067,628 | A | * | 7/1913 | Wilke ............................. | 295/7 |
| 2,016,828 | A | * | 10/1935 | Brownyer ....................... | 295/7 |
| 2,226,876 | A | * | 12/1940 | Schmidt ......................... | 295/1 |
| 3,044,820 | A | * | 7/1962 | Cox ............................... | 295/1 |
| 3,107,115 | A | * | 10/1963 | Kastner ......................... | 295/7 |
| 3,580,093 | A | * | 5/1971 | Tomizawa ..................... | 295/11 |
| 5,183,306 | A | | 2/1993 | Emilsson | |
| 5,702,141 | A | * | 12/1997 | Broucke et al. ............... | 295/7 |

FOREIGN PATENT DOCUMENTS

| | | | | |
|---|---|---|---|---|
| DE | 4125885 A1 | * | 2/1993 | .................... 295/7 |
| EP | 0 050 567 A | | 4/1982 | |
| EP | 0 082 273 A | | 6/1983 | |
| GB | 408377 | | 5/1934 | |
| GB | 2 033 313 A | | 5/1980 | |
| JP | 2-88302 A | * | 3/1990 | .................... 295/7 |

\* cited by examiner

Primary Examiner—S. Joseph Morano
Assistant Examiner—Jason R. Bellinger
(74) Attorney, Agent, or Firm—Oliff & Berridge, PLC

(57) ABSTRACT

A railway vehicle wheel always improve damping characteristics when a thin visco-elastic layer is placed between the tire and the connecting disc or ring. The visco-elastic layer improves damping through shearing action and has a thickness that is lower than that of the tire by an order of magnitude.

15 Claims, 5 Drawing Sheets

RAILWAY VEHICLE WHEEL WITH IMPROVED DAMPING CHARACTERISTICS

BACKGROUND OF THE INVENTION

1. Field of Invention

The invention is related to a railway vehicle wheel comprising a hub and a tire provided with a flange, which hub and tire are mutually connected by means of a disc or a number of spokes.

2. Description of Related Art

In operation, the contacts between rails and railway constitute sources of vibrations which are transmitted to the wheel shaft. Consequently, these vibrations are also imposed on the bearings and finally the superstructure of a train wagon or locomotive. They are experienced by the passengers and train personnel as unpleasant; moreover, fatigue of the steel material of the wheels and shafts may be aggravated thereby.

From U.S. Pat. No. 5,183,306, a railway vehicle wheel is known comprising a rubber ring situated between the hub and the tire of the wheel. In a radial cross-section, said ring has an U-shape, leading to radial shear of the rubber material. The ring has a large thickness, of the same order of magnitude as the tire.

A disadvantage of this known railway vehicle wheel is its rather great radial resilience, and the complicated structure with separate connecting rings and bolts.

SUMMARY OF THE INVENTION

The object of the invention is to provide a railway vehicle wheel having improved damping properties, while maintaining its stiffness. This object is achieved in that the tire comprises a thin visco-elastic layer for dissipating vibrations originating from the contact with a railway track.

In the rail wheel according to the invention, visco-elastic material layer is applied that dissipates energy under shear. In particular, vibration energy is thereby damped out quickly despite the small thickness of the layer. Said thickness is of a smaller order of magnitude than the thickness of the tire.

According to the invention, the visco-elastic layer is loaded under shear in the circumferential (or tangential) direction, which provides the required relative displacements in the rubber layer for obtaining the desired damping properties.

Preferably, the visco-elastic layer is circular and concentric to the tire. Thus, the layer is of a simple and straightforward design, which enables a relatively cheap and easy manufacturing process of the wheel in question.

To optimize the damping, the visco-elastic layer is situated at a distance from the depth at which maximum shear occurs in the tire, said shear resulting from the contact between the tire and the railway track under rolling motion of the wheel on the track. The position to be selected depends on the load on the wheel, which defines the shear stress at each depth, and the fatigue strength of the visco-elastic material.

Said depth is selected as a compromise between the useful life of the layer, and the amount of energy dissipation required. Said dissipation and fatigue are governed by the shear stresses experienced by the visco-elastic layer. Thus, the damping can be adjusted in dependence of the field of application, as a compromise between life and vibration reduction.

In particular, the distance of the visco-elastic layer to the rolling surface of the tire may be smaller than the depth at which maximum shear occurs in the tire.

A reliable construction is obtained in case the tire comprises a main ring body carrying the flange, as well as a concentric ring body, the visco-elastic layer being interposed between the main ring body and the concentric ring body.

Said concentric ring body at the side facing away from the flange is held against coming off from the main ring body by a fixing means. In case the visco-elastic layer would be damaged, the integrity of the railway vehicle wheel in question is still guaranteed so as to provide the required safety in service.

The fixing means may be a fixing ring mounted on the main ring body. Said fixing ring may be mounted onto the main ring body by means of an interference fit.

Other mounting means could be applied as well, such as bolts or adhesives.

Moreover, at least two layers of visco-elastic material are applied, said layers being each surrounded by a concentric ring body.

The thickness of the visco-elastic layer is of a smaller order of magnitude than the thickness of the tire.

Moreover, at least two layers of visco-elastic material can be applied.

BRIEF DESCRIPTION OF THE DRAWINGS

The invention will be described further with reference to an example of a railway vehicle wheel according to the invention as shown in the figures.

DETAILED DESCRIPTION OF PREFERRED EMBODIMENTS

Figure 1:
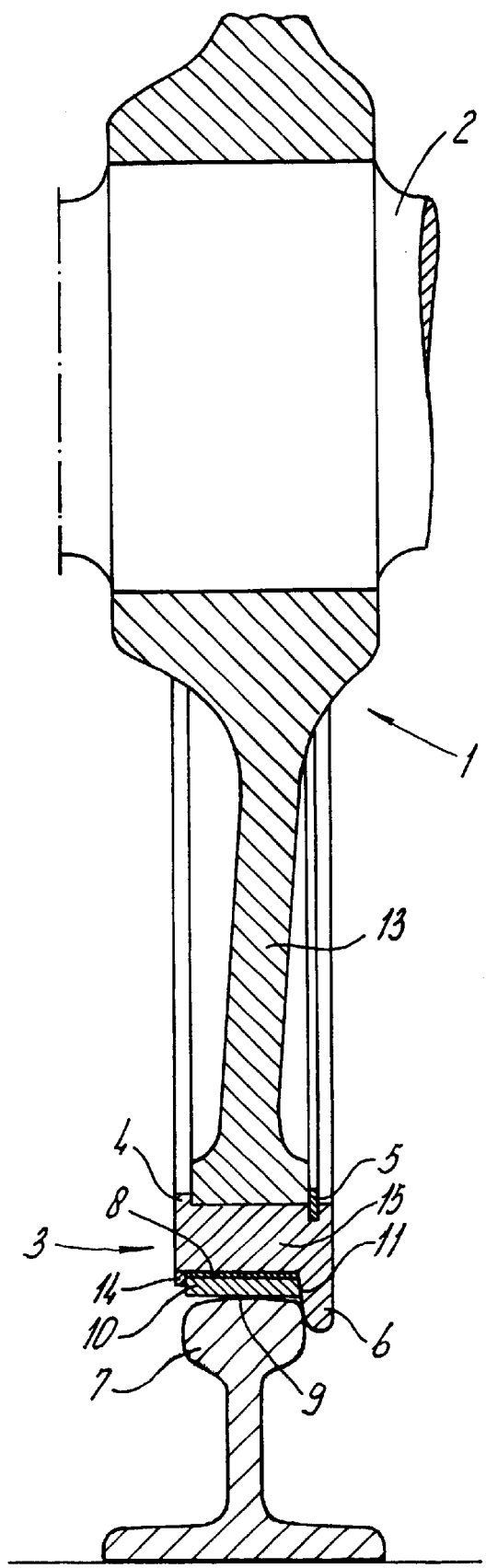
FIG. 1 shows a radial cross-section view of the railway vehicle wheel according to the invention.

The railway vehicle wheel 1 as shown in FIG. 1 comprises a hub 2 and a tire 3 which are interconnected by means of connecting disc 13. The tire 3 has an inwardly protruding rim 4, which together with a clamping ring 5 provides the required connection between said tire 3 and the connecting disc 13.

The tire 3 carries a flange 6, for guidance of the railway vehicle wheel with respect to the rail 7.

According to the invention, the tire 3 has a thin layer 8 of a visco-elastic material, at a distance from its rolling surface 9.

In the embodiment shown, the visco-elastic layer 8 is covered by means of a steel ring 10, which rests with its one sideface to the facing surface 11 of flange 6.

The steel ring 10 and the main ring body 15 of the tire 3 are firmly held together by means of a fixing ring 14. Said fixing ring 15 is mounted by means of an interference fit on the main ring body 15, in such a way that the visco-elastic layer 8 as well as the steel ring 10 are held captive between said fixing ring 14 and the flange 6.

Figure 2:
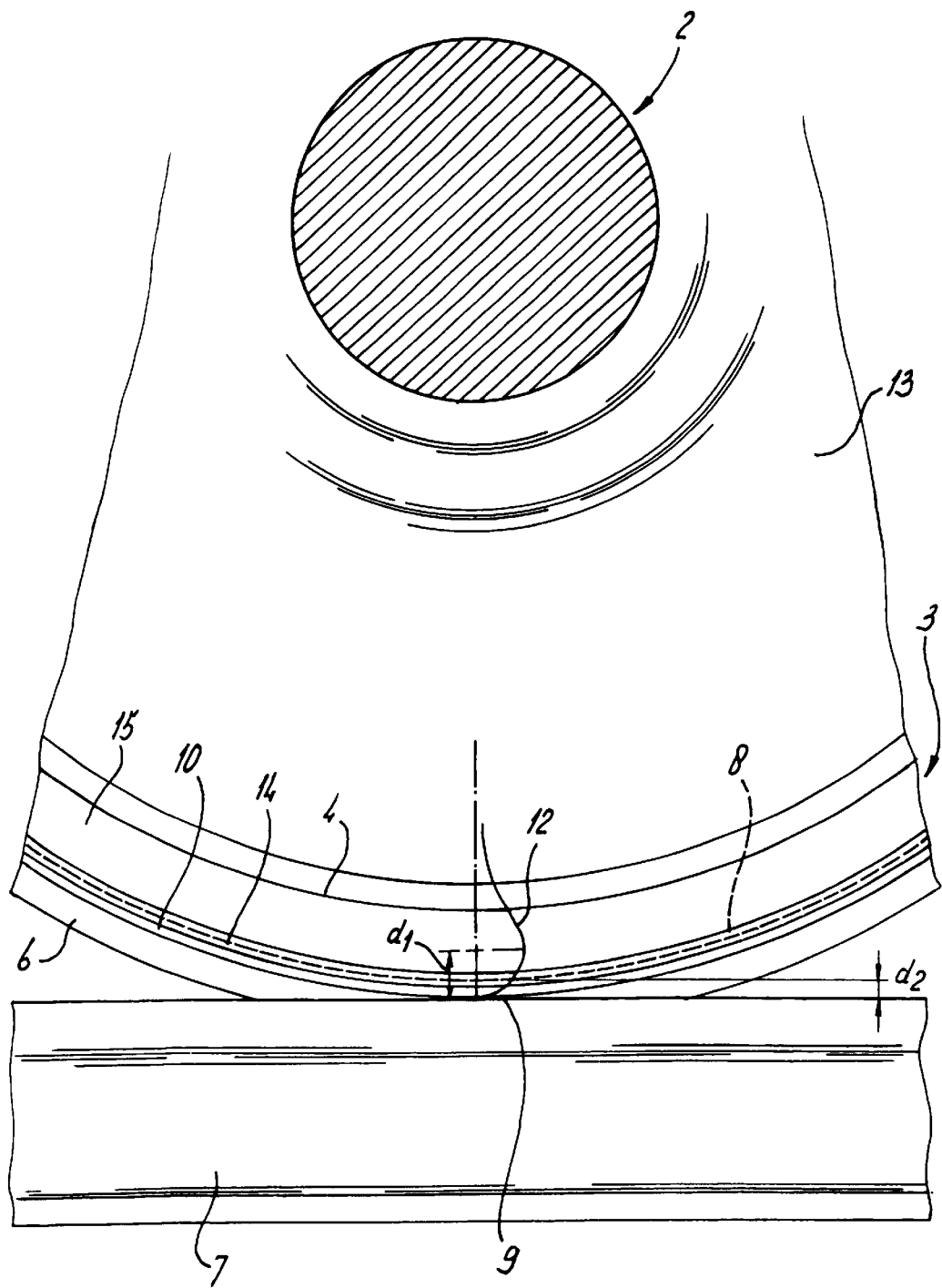
FIG. 2 an axial view of a part of the wheel according to FIG. 1.

In the axial view of FIG. 2, wherein the fixing ring 14 has been omitted for reasons of clarity, a part of the railway vehicle wheel has been depicted, together with a part of the railway track 7. Also a schematic representation 12 of the shear stress distribution in the thickness of the wheel, starting from its rolling surface 9, has been given. At the depth d1, the shear stress is at a maximum, but the visco-elastic layers 8 is situated at a distance d2.

At position d2, the shear stresses are somewhat lower, and thereby the damping effect, resulting from the deformations of the visco-elastic layer 8 due to the shear stresses, is somewhat less. On the other hand, the visco-elastic material 8 is exposed to less heavy shear loads, which is beneficial for a longer service life.

Thus, the depth d2 at which the layer of visco-elastic material 8 is situated, has been selected as a compromise between optimized damping and fatigue life.

Figure 3:
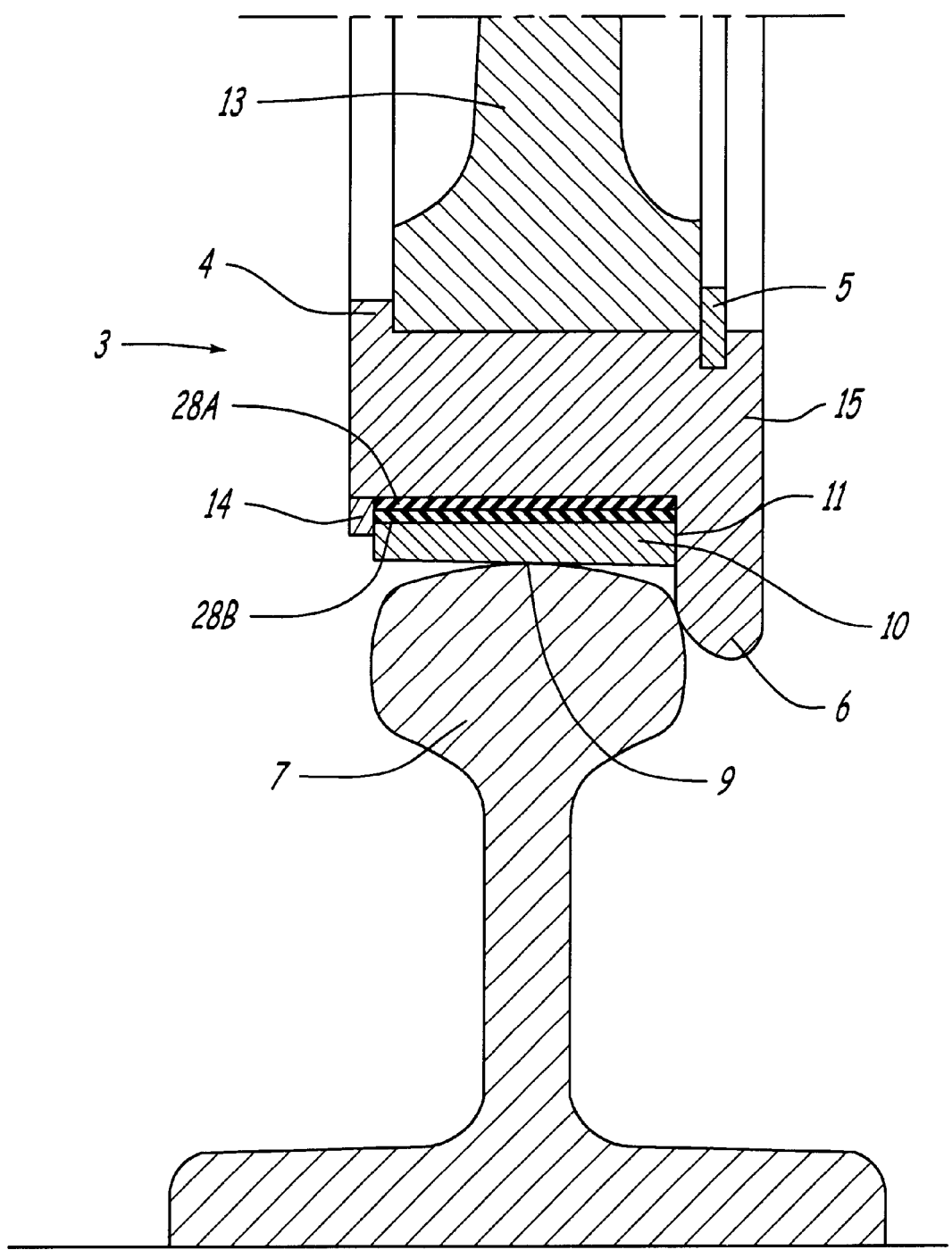
FIG. 3 shows an alternate radial cross section of the railway vehicle wheel according to tie invention.

FIG. 3 illustrates a radial cross section view of the railway vehicle wheel 1' with two visco-elastic layers 28A and 28B.

Figure 4:
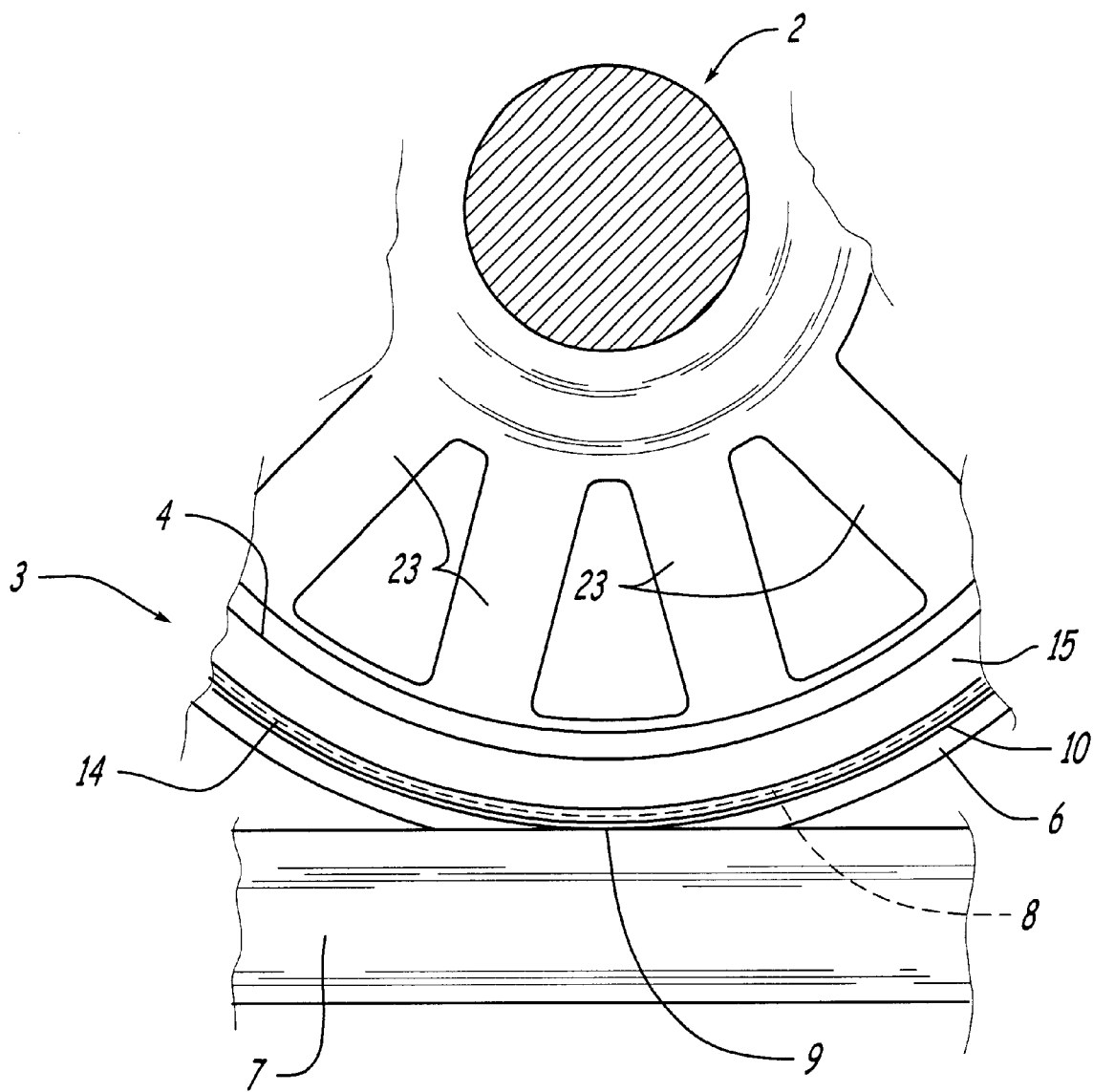
FIG. 4 shows an alternate axial view of a part of a wheel.

FIG. 4 illustrates an alternate axial view of a part of a railway vehicle wheel 1" with connecting spokes 23 instead of the connecting disc 13.

Figure 5:
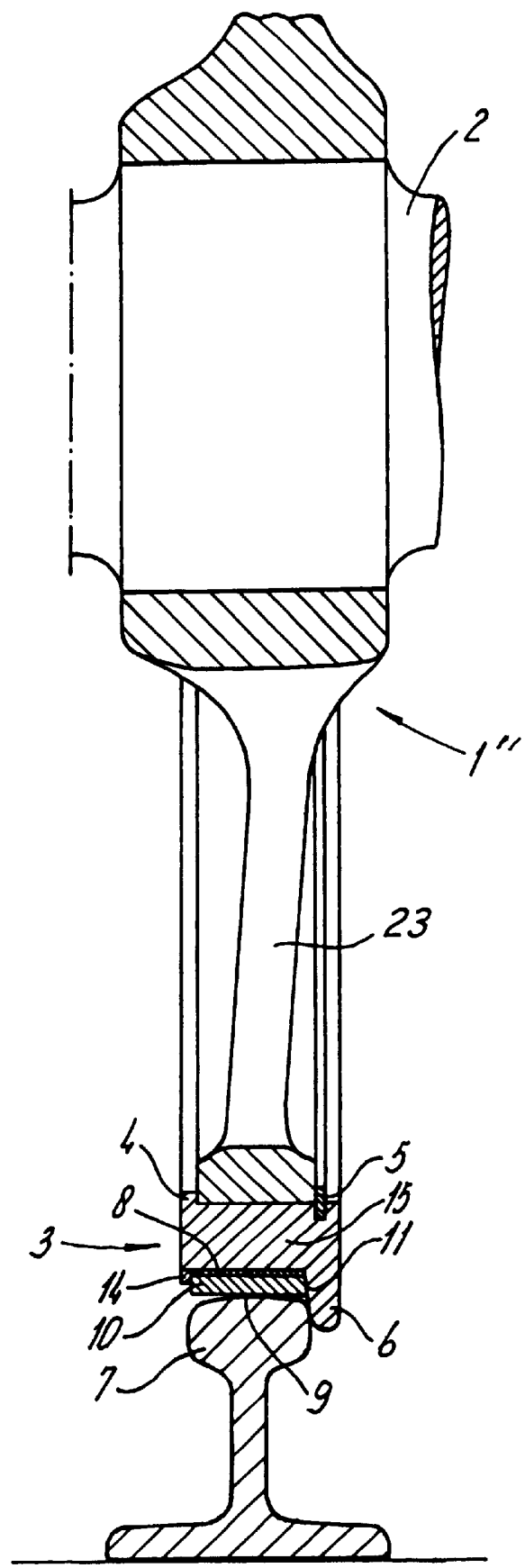
FIG. 5 shows an alternate radial cross section view of the railway wheel with spokes between the hub and the tire.

FIG. 5 illustrates an alternate radial cross section view of railway vehicle wheel 1" with connecting spokes 23 instead of the connecting disc 13.

What is claimed is:

1. Railway vehicle wheel comprising a hub and a tire provided with a flange, which hub and tire are mutually connected by means of a disc or a number of spokes, the tire comprising a thin visco-elastic layer for dissipating vibrations originating from a contact of the railway vehicle wheel with a railway track, wherein the thickness of the visco-elastic layer is of a smaller order of magnitude than the thickness of the tire.

2. Railway vehicle wheel according to claim 1, wherein the visco-elastic lay is circular and concentric to the tire.

3. Railway vehicle wheel according to claim 1, wherein the visco-elastic layer is situated at a distance from a depth at which maximum shear occurs in the tire, said shear resulting from the contact between the tire and the railway track under rolling motion of the wheel on the track.

4. Railway vehicle wheel according to claim 3, wherein the distance of the visco-elastic layer to a rolling surface of the tire is smaller than the depth at which maximum shear occurs in the tire.

5. Railway vehicle wheel according to claim 3, wherein the distance of the visco-elastic layer to a rolling surface of the tire is selected dependent on the wheel load.

6. Railway vehicle wheel according to claim 3, wherein the distance of the visco-elastic layer to a rolling surface of the tire is selected dependent on the fatigue strength of the visco-elastic material.

7. Railway vehicle wheel according to claim 1, wherein the tire comprises a main ring body carrying the flange, as well as a concentric ring body, the visco-elastic layer being interposed between the main ring body and the concentric ring body.

8. Railway vehicle wheel according to claim 7, wherein the concentric ring body at a side facing away from the flange is held against coming off from the main ring body by a fixing means.

9. Railway vehicle wheel according to claim 8, wherein the fixing means is a fixing ring mounted on the main ring body.

10. Railway vehicle wheel according to claim 9, wherein the fixing ring is mounted onto the main ring body by means of an interference fit.

11. Railway vehicle wheel according to claim 1, wherein at least two layers of visco-elastic material are applied, said layers being each surrounded by a concentric ring body.

12. Railway vehicle wheel according to claim 2, wherein the visco-elastic layer (8) is situated at a distance from the depth at which maximum shear occurs in the tire, said shear resulting from the contact between the tire (3) and the railway track (7) under rolling motion of the wheel (1) on the track (7).

13. Railway vehicle wheel according to claim 4, wherein the distance of the visco-elastic layer (8) to the rolling surface (9) of the tire (3) is selected dependent on the wheel load.

14. Railway vehicle wheel according to claim 4, wherein the distance of the visco-elastic layer (8) to the rolling surface (9) of the tire (3) is selected dependent on the fatigue strength of the visco-elastic material.

15. Railway vehicle wheel according to claim 5, wherein the distance of the visco-elastic layer (8) to the rolling surface (9) of the tire (3) is selected dependent on the fatigue strength of the visco-elastic material.

* * * * *